United States Patent
Schroeder

[11] Patent Number: 5,884,825
[45] Date of Patent: Mar. 23, 1999

[54] HELMET HOLDER FOR USE ON A MOTORCYCLE

[76] Inventor: Aaron P. Schroeder, 1911 Burr Oak La., Lindenhurst, Ill. 60046

[21] Appl. No.: 828,987

[22] Filed: Mar. 31, 1997

[51] Int. Cl.⁶ ........................................................ B62J 7/06
[52] U.S. Cl. ............................ 224/413; 224/420; 224/456
[58] Field of Search ................................... 224/413, 420, 224/424, 425, 424.4, 456, 461, 459

[56] References Cited

U.S. PATENT DOCUMENTS

| | | |
|---|---|---|
| 2,583,550 | 1/1952 | Dennis et al. ........................... 224/424 |
| 2,813,670 | 11/1957 | Kolkdziej ............................. 224/453 X |
| 3,399,855 | 9/1968 | Shirai . |
| 3,531,955 | 10/1970 | Taylor et al. . |
| 3,646,786 | 3/1972 | Baker . |
| 3,759,072 | 9/1973 | McLarnou ............................... 224/459 |
| 3,823,856 | 7/1974 | Uchida . |
| 3,896,643 | 7/1975 | Kawakami . |
| 3,904,238 | 9/1975 | Anderson et al. . |
| 4,063,637 | 12/1977 | Danforth . |
| 4,274,271 | 6/1981 | Todd et al. . |
| 4,436,352 | 3/1984 | Jolin ..................................... 224/413 X |
| 4,607,772 | 8/1986 | Hancock . |
| 4,733,805 | 3/1988 | Sawada ................................... 224/440 |
| 5,005,661 | 4/1991 | Taylor et al. ........................ 224/452 X |
| 5,487,497 | 1/1996 | Kwiatkowski ........................... 224/420 |

*Primary Examiner*—Renee S. Luebke
*Attorney, Agent, or Firm*—Meroni & Meroni

[57] ABSTRACT

A helmet holder assembly for holding a helmet in an upright position on a motorcycle including a body portion and a tubular structure connected to the body portion. The helmet holder assembly comprises a mounting assembly for removably securing the helmet holder assembly to the tubular structure. A mounting block structure is positioned over the body portion. At least one mounting rod is connected between the mounting block structure and the mounting assembly and thereby links the mounting block structure to the mounting assembly and maintains the position of the mounting block structure relative to the body portion. The mounting block structure includes a helmet receiving slot having an inner slot edge. The helmet receiving slot enables the helmet to be rotatably inserted therein so that when the helmet is being rotatably inserted therein and when the helmet is fully inserted therein a confronting painted surface of the helmet is maintained substantially free and clear of contact with the inner slot edge.

22 Claims, 9 Drawing Sheets

HELMET HOLDER FOR USE ON A MOTORCYCLE

BACKGROUND OF THE INVENTION

1. Field of the Invention

The present invention generally relates to an article holder for use on a motorcycle and specifically relates to a helmet holder for supporting a helmet on a motorcycle where the helmet is supported in a cantilever position and secured there substantially by the force of gravity alone.

2. Description of the Prior Art

In the prior art there are several helmet holder devices for use on a motorcycle, as evidenced by the patents cited in compliance with the applicant's Information Disclosure Statement submitted herewith. However, no cited device alone or in combination with another offers the features and advantages of my invention and also over comes the shortcomings of the prior art devices.

One significant problem with the prior art devices is they may require the original physical structure of the helmet to be altered in order to be supported in or lock to the prior art helmet holder, such as in U.S. Pat. Nos. 4,274,271 and 3,759,072 and 3,646,786. In addition to the disadvantage that once the helmet structure is altered it can never truly be returned to its original state, there is the significant safety consideration that altering the structure of the helmet is known to substantially reduce the ability of the helmet to effectively protect a rider in a crash situation. Also, it is well know that current motorcycle helmet regulations prohibit the alteration of the original physical structure of the helmet, thus making such helmet holding devices effectively unusable.

Another significant problem with the prior art devices is that they do not securely support a helmet and rather the helmet is free to dangle from the vehicle and crash into the vehicle itself as well as other objects adjacent the vehicle. Such devices are seen in U.S. Pat. Nos. 4,733,805; 4,063,637; 3,823,856; 3,531,955 and 3,399,855. Aside from obvious damage that a dangling helmet can do to the other objects it may come into contact with, the helmet itself can be structurally damaged and made effectively unusable due to visibly undetectable stress cracks caused when the helmet bangs into another object. Such visibly undetectable stress cracks only become obviously detectable when it is too late, namely, when a rider wearing the structurally damaged helmet is in a vehicle crash and the rider's helmet prematurely fails upon impact with another object due to the stress cracks.

Yet another problems with the prior art devices are they do not provide a helmet holder for holding a helmet while the motorcycle is in operation on a roadway, such as seen in U.S. Pat. No. 3,896,643. It is well know that wearing a helmet is not required by law in all states and thus when a rider is in such a state he or she needs a safe and secure place to put the helmet for later use. Also, when a rider is not on his or her motorcycle he or she needs a place to put the helmet without fear of it falling or being damaged. This is especially desirable when moving the cycle short distances such as from the garage, around the gas pump, at camp sites, at bike meets, in the parking lot, etc. Additional considerations for mounting a helmet in an upright position in the front portion of a motorcycle are limited mounting space in the front portion as well as determining a mounting location that will not interfere with the other parts and accessories in the front portion, namely, a windshield, a handle bar structure, a front console, and a radio, among others, depending on the particular motorcycle.

Still other problems with the prior art devices, and in particular U.S. Pat. No. 3,896,643, is that such a device is intended to exert a substantial amount of clamping type pressure on the helmet to maintain the position of the same in the holder. Such clamping pressure unfortunately tends to significantly deform an interior surface of the helmet which is usually constructed of a cushion material that is easily deformable. Additionally, employing a clamping mechanism requires significant surface area contact between the clamping member and an outside painted surface of the helmet. This contact often results in scratching or marring the outside painted surface.

These and other types of helmet holders disclosed in the prior art do not offer the flexibility and inventive features of my Helmet Holder For Use On A Motorcycle. As will be described in greater detail hereinafter, the disclosed and claimed features of the present invention differs from those previously proposed.

OBJECTS AND SUMMARY OF THE INVENTION

Accordingly, it is an object of this invention to provide a quick and convenient place to set a helmet.

Another object is to provide a holder that eliminates the potential damage associated with balancing a helmet on a dash, mirror or seat of a vehicle or dangling the helmet from a helmet holder pin.

Yet another object of my invention is to provide a helmet holder for use on a motorcycle such that a helmet can be maintained in an upright position over the vehicle, both when the motorcycle is in operation on a roadway and when it is non-operation and in a parked position or moved manually.

Another object of the present invention is to provide a helmet holder for use on a motorcycle such that a helmet can be maintained in an upright position relative thereto and located either forwardly or rearwardly on the vehicle.

Still another object of the present invention is to provide a helmet holder for use on a motorcycle such that a helmet can be maintained in an upright position and located substantially over a longitudinal of the vehicle and connected to a handle bar structure directly or indirectly.

Yet another object of the present invention is to provide a lock mechanism for securing a helmet to the helmet holder assembly on the vehicle.

Another object of the present invention is to provide a helmet holder for use on a motorcycle where the helmet holder has several adjustability features to make it adaptable for use with various different helmets and various different motorcycles.

Still another object of the present invention is to provide a helmet holder for use on a motorcycle such that a helmet can be maintained in an upright position relative thereto and the integrity of the original physical structure of the helmet is not altered in order to be supported in or lock to the helmet holder.

Yet another object of the present invention is to provide a helmet holder for use on a motorcycle such that a helmet can be maintained in an upright position relative thereto and when the helmet is being inserted into and then supported by the helmet holder, minimal compression forces are applied to an inside surface of the helmet and direct contact with a confronting painted surface of the helmet is substantially prevented.

To achieve the foregoing and other objectives, and in accordance with the purposes of the present invention a Helmet Holder For Use On A Motorcycle is provided. According to my present invention I have provided a helmet holder assembly for holding a helmet in an upright position on a motorcycle including a body portion and a tubular structure connected to the body portion, the helmet holder assembly comprising a mounting assembly for removably securing the helmet holder assembly to the tubular structure. The holder further includes a mounting block structure positioned over the body portion. At least one mounting rod is connected between the mounting block structure and the mounting assembly and thereby links the mounting block structure to the mounting assembly and maintains the position of the mounting block structure relative to the body portion. The mounting block structure includes a cantilever slot having an inner slot edge, and the cantilever slot enables the helmet to be rotatably inserted therein so that when the helmet is being rotatably inserted therein and when the helmet is fully inserted therein a confronting painted surface of the helmet is maintained substantially free and clear of contact with the inner slot edge.

According to other feature sin invention I have provided a helmet holder assembly for holding a helmet in an upright position on a motorcycle vehicle including a body portion and a handle bar structure mounted thereon, the helmet holder assembly comprising first means for removably securing the helmet holder assembly to the handle bar structure. A mounting block structure is substantially positioned over a longitudinal axis of the body portion. Second means links the first means to the mounting block structure and maintains the position of the mounting block structure relative to the longitudinal axis of the body portion. The mounting block structure may further include a base plate, an arm connected to the base plate, a post connected to the base plate a distance from the arm and the distance between the arm and the post defining a helmet receiving slot located therebetween. Then, the helmet receiving slot enables the helmet to be rotatably inserted therein by advancing a lower back edge portion of the helmet into the helmet receiving slot, forwardly rotating the helmet to drop a lower front edge portion of the helmet relative to the lower back edge portion, the lower front edge portion being positioned on an inclined plane extending downwardly and the helmet when fully inserted in the helmet receiving slot having the lower front edge portion positioned slightly below the lower back edge portion.

Another feature of my invention relates to an improvement in my helmet holder comprising cantilever means connected to the mounting block structure for supporting the helmet in a cantilevered position over the body portion and for maintaining the helmet in the cantilevered position substantially only by a force of gravity exerted on the helmet so cantileveredly positioned.

Yet other features relate to my helmet holder assembly including lock means connected to the mounting block structure for selectively locking the helmet to the helmet holder assembly. The lock means may comprise a lock arm having a first lock arm end and a second lock arm end where the first lock arm end is pivotally connected to the arm and a lock is connectable to the second lock arm end. Then, as is generally the case with most helmets on the market, the helmet has a helmet strap connected thereto. The lock means can be employed when the helmet strap is connectable to the lock arm to selectively lock the helmet to the helmet holder assembly.

Still other features of my invention concern the particular mounting assemblies contemplated, namely, a split clamp assembly engaged about an outer circumference of the handle bar structure or a lower mounting rod and a mounting cap mounted to a handle bar support assembly to thereby securing the lower mounting rod to the handle bar structure. Moreover, the split clamp assembly may include a pair of opposed first ends and a pair of opposed second ends where the split clamp assembly is adapted to be biased at the pair of opposed first ends by a nut and bolt type structure such that biasing the pair of opposed first ends together pivotally biases the pair of opposed second ends together securely about the handle bar structure.

Yet another feature of my invention concerns the particular rigid mounting rod assemblies utilized to link the mounting assembly and the mounting block structure, namely the mounting rod comprising a single mounting rod or an at least two part mounting rod arrangement where in either case the mounting rod assembly serves to adjustably connect the mounting assembly and the mounting block structure as well as substantially position the mounting block structure over the body portion of the motorcycle and depending on the desired mounting location particular substantially position the mounting block structure over the longitudinal axis of the body portion.

According to other features in invention I have provided the cantilever means comprising: a post connected to the base plate; an arm connected to the base plate; and, the post positioned a distance from the arm to provide a helmet receiving slot for the helmet to be inserted therein and loosely held by the force of gravity in the cantilevered position whereby minimal compression forces are applied to an inside surface of the helmet and direct contact with a confronting painted surface of the helmet is substantially prevented.

Further features of my invention concern the post being selectively positionable in a direction towards and away from the arm and the post being is angled in a backward direction away from the arm.

Still other features of my invention concern the arm being pivotally connected to the base plate, the arm being angled in a direction towards the post and adapted to substantially coincide with a contoured shape of the inside surface of the helmet and the arm having a slot therein and the slot positioned to enable the arm to be collapsed over the post for compact storage of the helmet holder assembly both when connected and disconnected from the motorcycle vehicle.

Other objects, features and advantages of my invention will become more readily apparent upon reference to the following description when taken in conjunction with the accompanying drawings.

DETAILED DESCRIPTION OF THE PREFERRED EMBODIMENT

Figure 1:
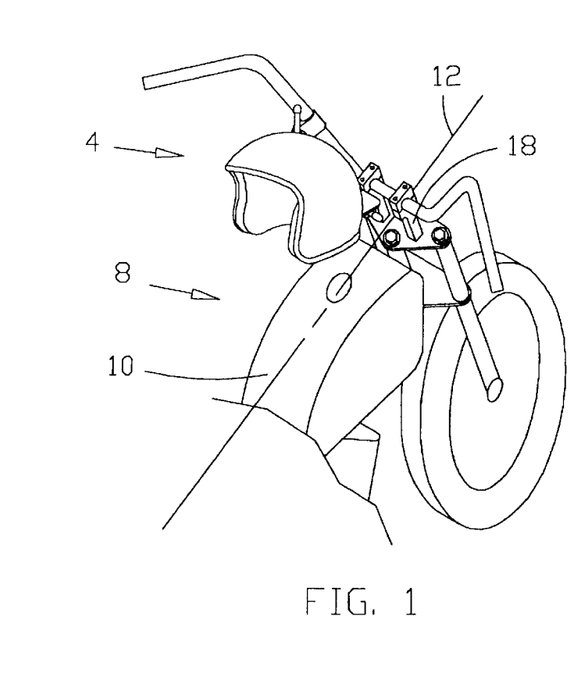
FIG. 1 is a perspective view of my helmet holder or helmet holder assembly mounted on a motorcycle with a helmet supported thereon, in accordance with the features of my invention.
Figure 2:
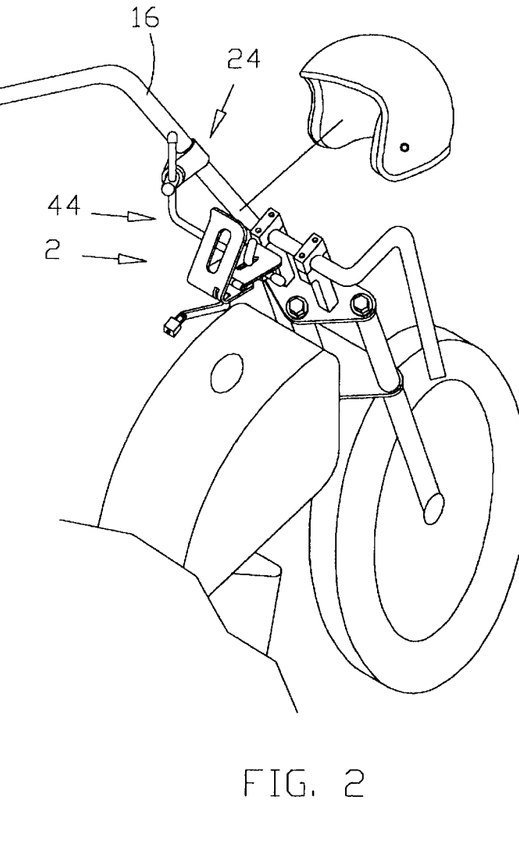
FIG. 2 is an enlarged perspective view of my helmet holder or helmet holder assembly mounted on a motorcycle as shown in FIG. 1, here without a helmet supported thereon.
Figure 12:
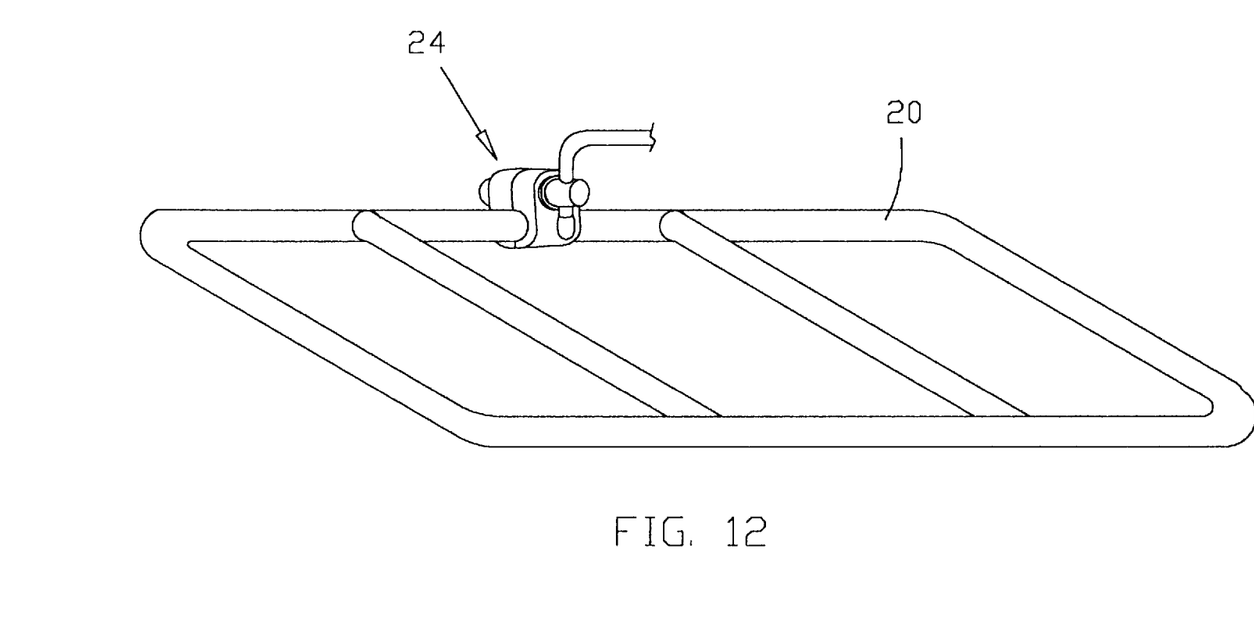
FIG. 12 is a top view of another embodiment of my invention where a mounting assembly is connected to a rack structure.

Referring now to the drawings, FIG. 1 shows my new and improved helmet holder or helmet assembly 2. This assembly 2 is uniquely designed to hold a helmet 4 is an upright position over a motorcycle 8 and the like, as shown in FIG. 1 amongst others. My assembly 2 can be utilized when the motorcycle is in motion or stationary, as desired by the motorcycle rider (where the inventor makes no claim about the legality of using this invention when the motorcycle is in motion). The motorcycle generally includes a body portion 10 comprising any structure between the wheels of a motorcycle (the wheels not being specifically shown in tandem), a handle bar structure 16 and a handle bar support assembly 18. The handle bar structure is mounted to the handle bar support assembly by any of several ways known in the prior art. The handle bar structure 16 is just one type of tubular structure mounted to the motorcycle 8 where my holder 2 can be secured. Another such tubular structure mounted to the motorcycle 8 is a rack structure 20, as shown in FIG. 12.

In my invention, the helmet holder 2 includes a mounting assembly for removably securing the helmet holder to the handle bar structure 16. In one embodiment of my invention, as shown in FIG. 1, the mounting assembly comprises a split clamp assembly 24. The split clamp assembly is engageable about an outer circumference 26 of the handle bar structure. The clamp assembly 24 includes a pair of opposed first ends 28 and a pair of opposed second ends 30. In operation, the clamp assembly can be biased at the pair of opposed first ends 28 by a nut and bolt type structure 2. In this way, biasing the pair of opposed first ends together by tightening the nut and bolt type structure simultaneously pivotally biases the pair of opposed second ends 30 together securely about the handle bar structure.

Figures 13, 14:
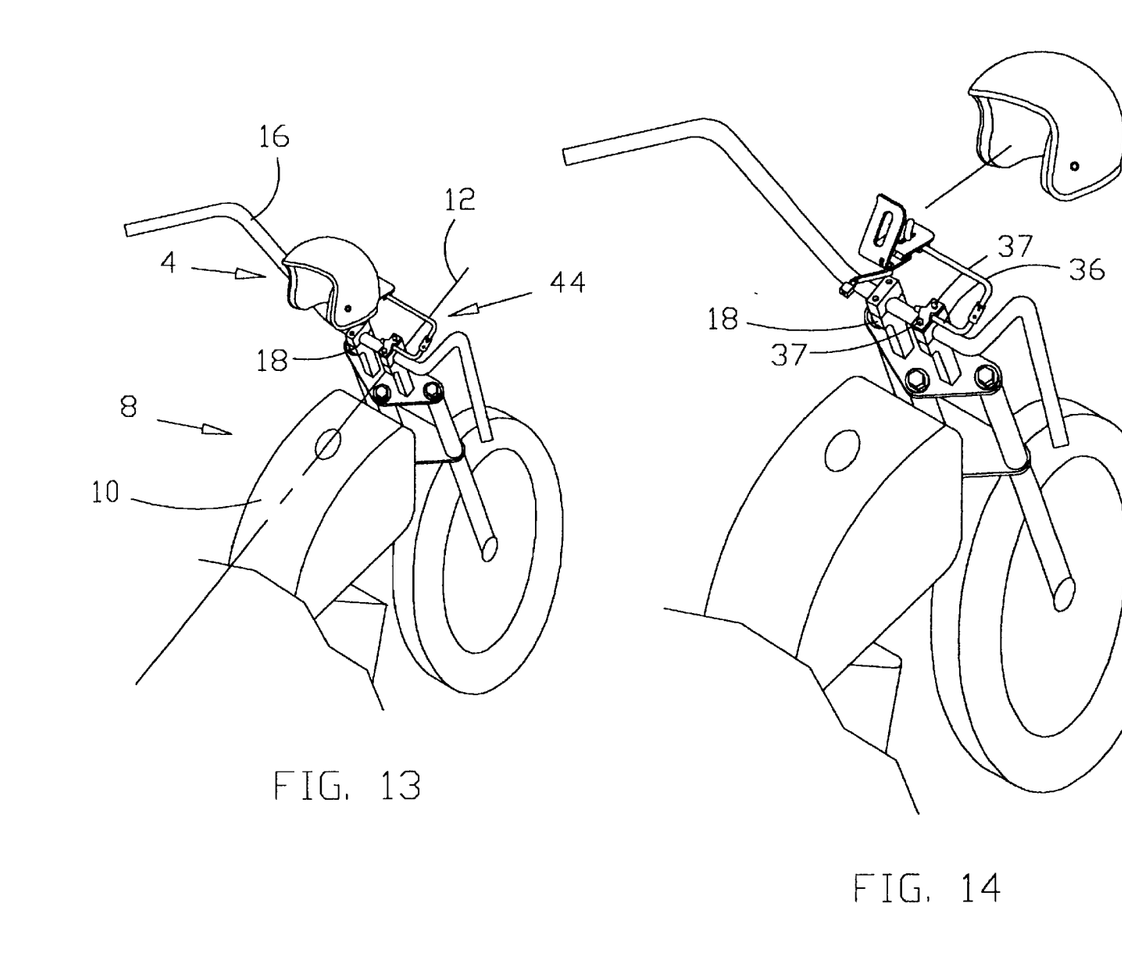
FIG. 13 is a perspective view of another embodiment of my helmet holder or helmet holder assembly mounted on a motorcycle with a helmet supported thereon, in accordance with the features of my invention.
FIG. 14 is an enlarged perspective view of another embodiment of my helmet holder or helmet holder assembly mounted on a motorcycle as shown in FIG. 13, here without a helmet supported thereon.

In a second embodiment of my invention, as shown in FIG. 13, the mounting assembly comprises a mounting cap 34, a lower mounting rod or rigid lower mounting rod 36, and the handle bar support assembly 18. In operation, the lower mounting rod 36 is positioned between the mounting cap 34 and the handle bar support assembly 18. Then, the mounting cap is mounted to the handle bar support assembly by any means known in the prior art, such as bolt members 37, thereby securing the lower mounting rod to the handle bar structure indirectly via direct attachment to the handle bar support assembly, as shown in FIG. 14.

The helmet holder 2 further includes a mounting block structure 40. Critical to my invention is the placement of the mounting block structure 40 over the body portion of motorcycle. In this way, the helmet is maintained in an upright position to keep the elements of water, sunlight and the like out of an inside surface 64 of the helmet.

Moreover, when the helmet holder is secured to the handle bar structure or handle bar support assembly, excellent results are obtained when the mounting block structure is positioned between the handle bar structure, and in particular, over a longitudinal axis 12—12 of the body portion. In this way, the helmet holder is positioned for unimpeded movement when a rider is steering the motorcycle, either during operation of the vehicle or when manually moving the vehicle during non-operation. As discussed earlier, movement may be impeded by structures of the motorcycle itself, such as the windshield, the front console, the radio, etc., or by the handle bar structure, all depending on the location of the helmet holder relative to the motorcycle. My invention overcomes these shortcomings in the prior art by providing the feature of tandem movement of the helmet holder with the handle bar structure combined with the particular placement of the helmet holder between the handle bars and preferably over a longitudinal axis of the body portion.

Figures 3, 4, 5:
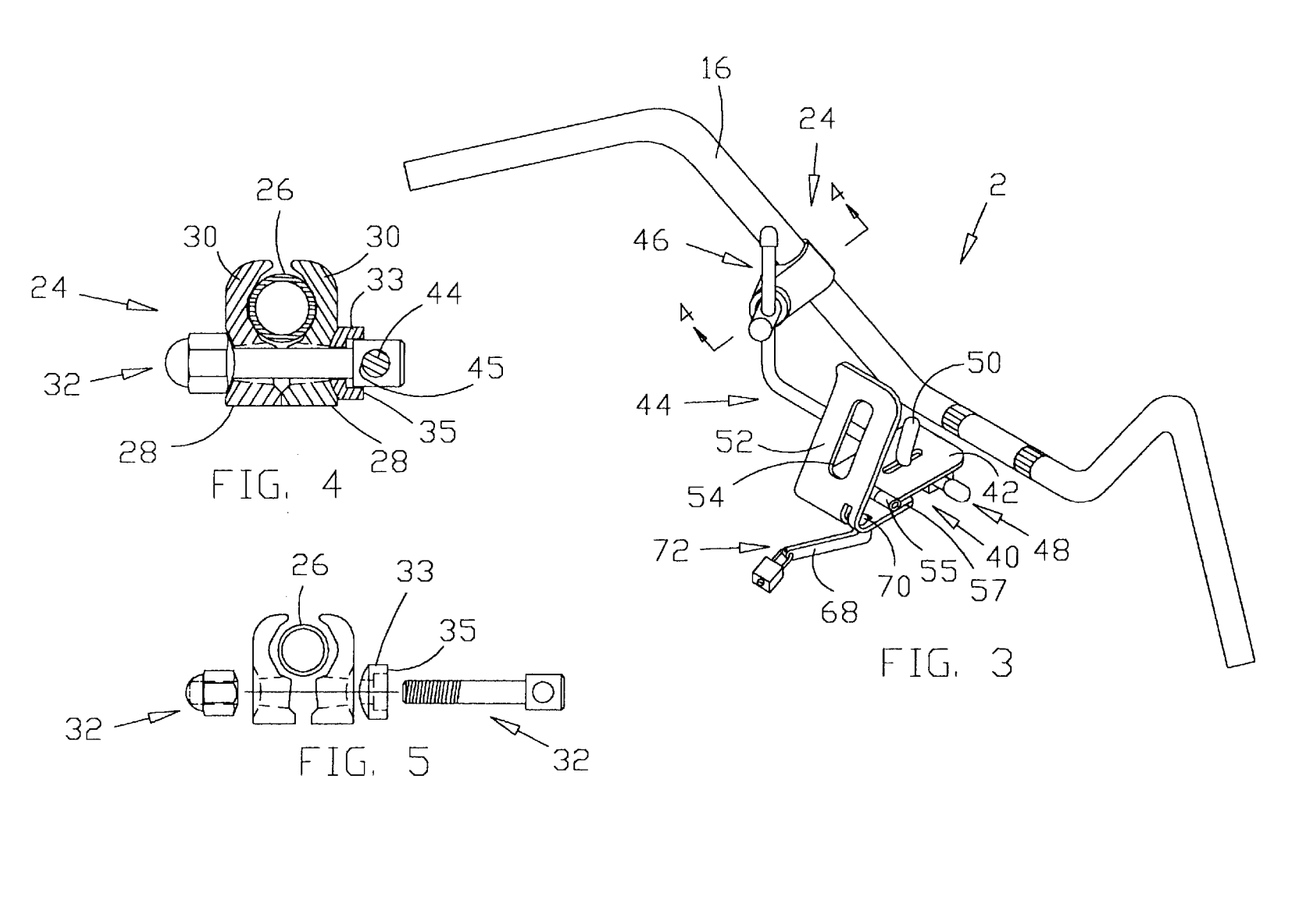
FIG. 3 is a perspective view of my helmet holder assembly connected to a handle bar structure, which handle bar structure is disconnected from the motorcycle shown in FIG. 2.
FIG. 4 is an enlarged cut away view of a split clamp assembly of my helmet holder assembly taken along the line 4—4 shown in FIG. 3.
FIG. 5 is an exploded partial top view of the split clamp assembly shown in FIG. 3, without a mounting rod connected thereto.
Figures 6, 7:
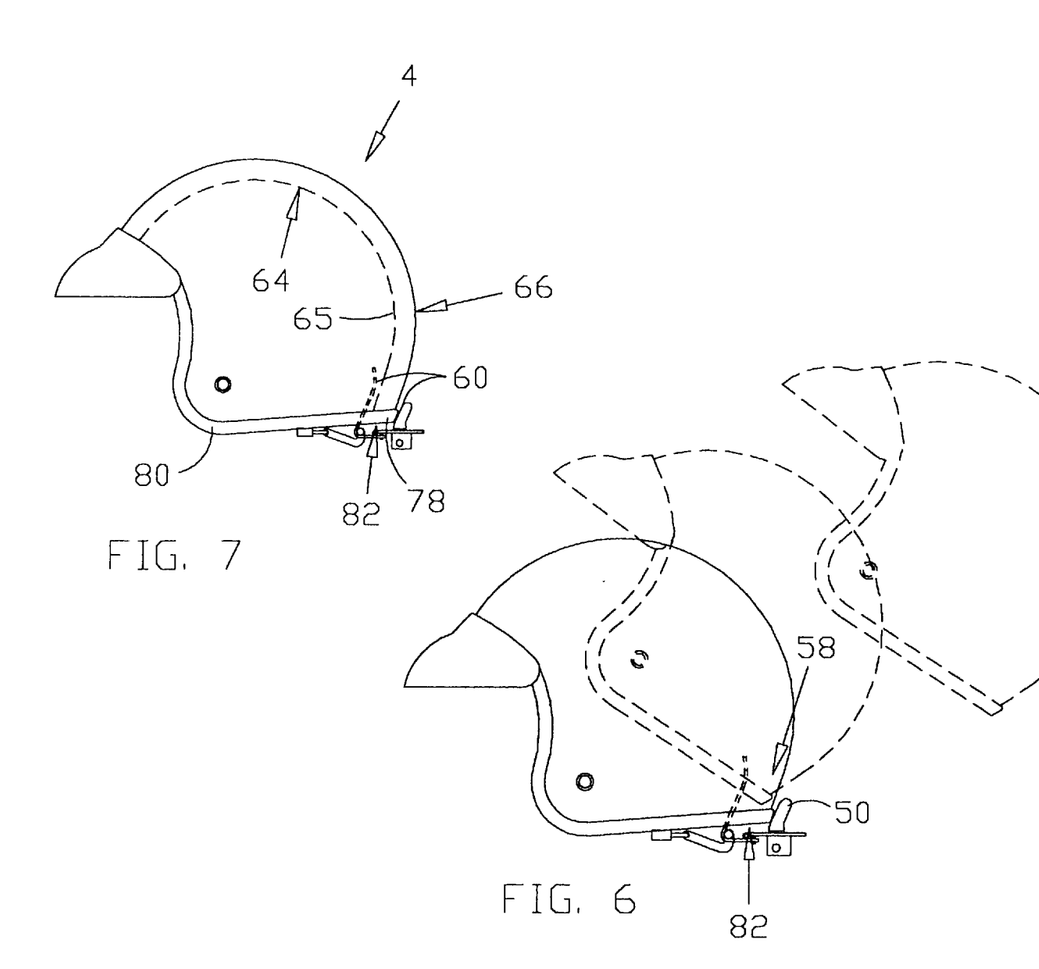
FIG. 6 is a partial side view of my helmet holder assembly where a helmet is being rotatably inserted into a helmet receiving slot of my helmet holder assembly, between an arm and a post connected to the mounting block structure shown, in accordance with the features of my invention.
FIG. 7 is a view of my helmet holder assembly and helmet shown in FIG. 6 where the a helmet is fully inserted into the helmet receiving slot and such that a lower front edge portion is positioned slightly below a lower back edge portion.
Figures 8, 9:
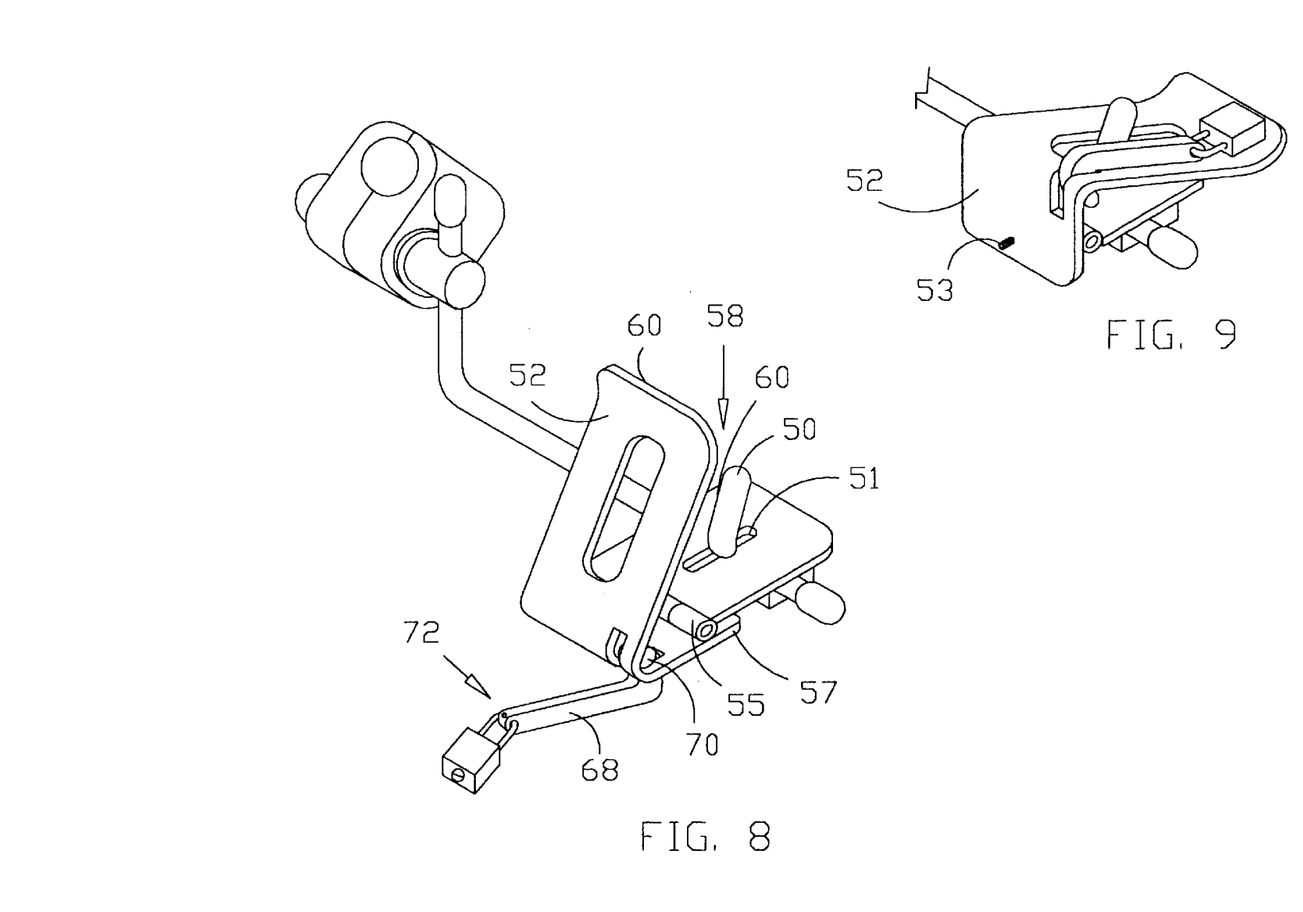
FIG. 8 is an enlarged view of the helmet holder assembly shown in FIG. 3, where the helmet holder assembly is not attached to a tubular structure and the helmet holder assembly is in an open position.
FIG. 9 is a partial view of the helmet holder assembly shown in FIG. 8, where the helmet holder assembly is in a collapsed position.

The mounting block structure 40 is linked to the mounting assembly by a rigid mounting rod 44. This link serves to both connect the mounting block structure 40 to the mounting assembly and also to maintain the position of the mounting block structure relative to the body portion. The mounting rod has a first mounting end 46 and a second mounting end 48. The first mounting end 46 is vertically and rotationally adjustably connected to the split clamp assembly, as shown in detail in FIGS. 3 and 4. The mounting rod 44 can be manually adjusted to selectively adjust the positioning of the mounting rod vertically and rotationally relative to the nut and bolt type structure 32. This is performed by washer structure 33 engaging a confronting surface 45 of the mounting rod in adjacency to the an outer edge 35 of the washer structure 33 when the nut and bolt type structure is tightened together.

Figure 10:
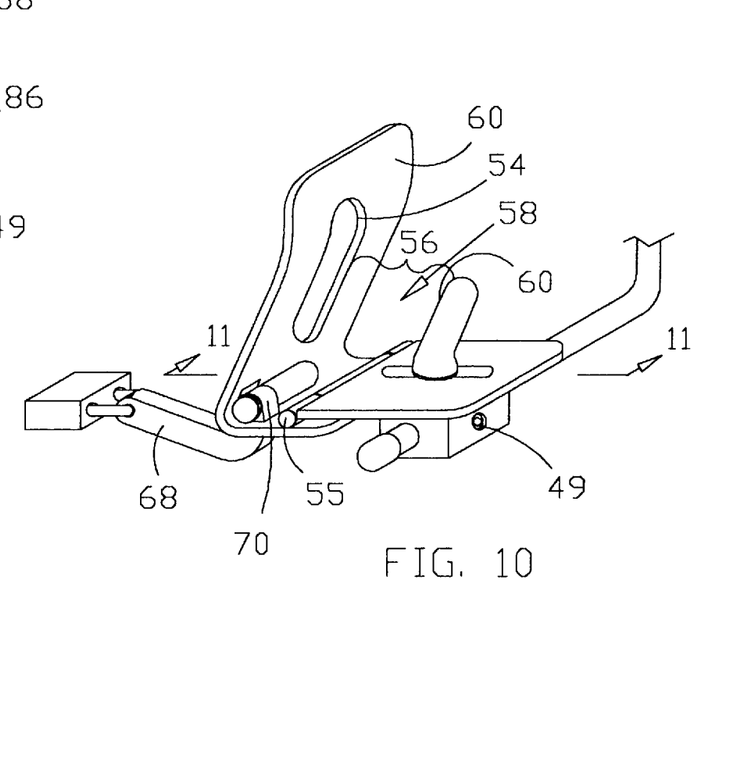
FIG. 10 is a partial rear perspective view of the helmet holder assembly shown in FIG. 8.
Figure 11:
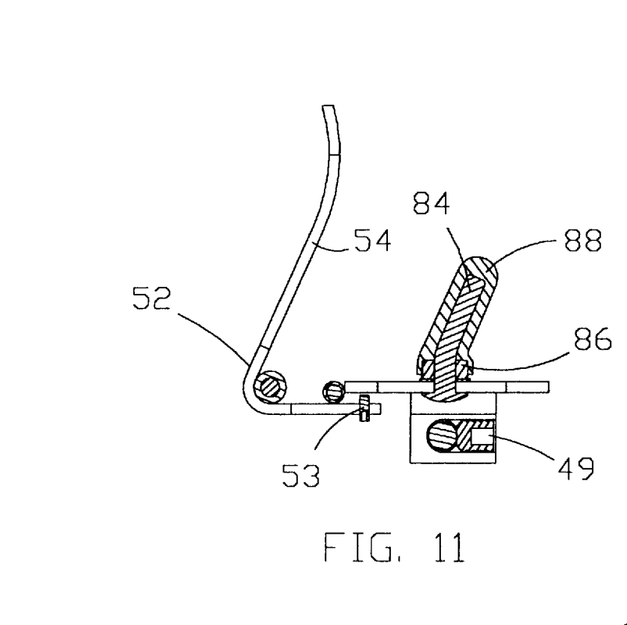
FIG. 11 is a cut-away side view taken along the line 11—11 of the mounting block structure shown in FIG. 10.

The second mounting end is horizontally and rotationally adjustably connected to the mounting block structure, as shown in FIGS. 10 and 11. Set screw 49 can be manually adjusted to selectively adjust the positioning of the mounting block structure horizontally and rotationally relative to the second mounting end. As previously discussed, for the handle bar structure mounted embodiments, excellent results are obtained when the first and second mounting ends respectively are adjustably connected to substantially position the mounting block structure over the longitudinal axis of the body portion.

In the second embodiment of my invention, as shown in FIG. 13, the rigid mounting rod 44 comprises a rigid upper mounting rod 38 connected to the lower mounting rod 36. Excellent results are obtained when the upper and lower rods are connected by an adjustable tubular coupling where respective ends from each upper and lower rods are inserted and secured therein, shown in detail in FIG. 15. Connecting the rods in this way increases the vertical and rotational adjustability of my invention and thus the universality among different motorcycle constructions. However, it should be understood that other suitable ways could be possible, such as utilizing a single continuous mounting rod to replace the individual upper and lower mounting rods, and the result would still fall within the disclosed and claimed features of my invention.

The final major component of my invention includes a post 50 and an arm 52, each connected to the mounting block structure. The post 50 is positioned a distance 56 from the arm to provide a helmet receiving slot 58. In utilizing my invention, the helmet is insertable in the cantilever slot 58 and loosely held therein by a force of gravity acting in the downward direction. In this way, minimal compression forces are applied to the inside surface 64 of the helmet and direct contact with a confronting painted surface 66 of the helmet is substantially prevented.

Stated differently, the helmet receiving slot 58 enables the helmet to be rotatably inserted therein by advancing a lower back edge portion 78 of the helmet into helmet receiving slot 58 and forwardly rotating the helmet to drop a lower front edge portion 80 of the helmet relative to the lower back edge portion 78. In this way, the lower front edge portion is positioned on an inclined plane 82 extending downwardly and the helmet when fully inserted in the helmet receiving slot has the lower front edge portion 80 positioned slightly below the lower back edge portion 78.

Stated yet another way, the helmet receiving slot 58 has an inner slot edge 60. The helmet receiving slot enables the helmet to be rotatably inserted therein so that when the helmet is being rotatably inserted therein and when the helmet is fully inserted therein the confronting painted surface 66 of the helmet is maintained substantially free and clear of contact with the inner slot edge 60.

In preferred embodiments of my invention, the mounting block structure includes a base plane 42. In this configuration, the post 50 and the arm 52 are connected to the base plate. It should be understood, however, that a base plate need not be a distinguishable component of my invention as shown in the drawings. As long as the function of the mounting block structure to support the helmet in a cantilevered position is obtained the scope of such a design is contemplated to fall within the disclosed and claimed scope of my invention.

Figure 15:
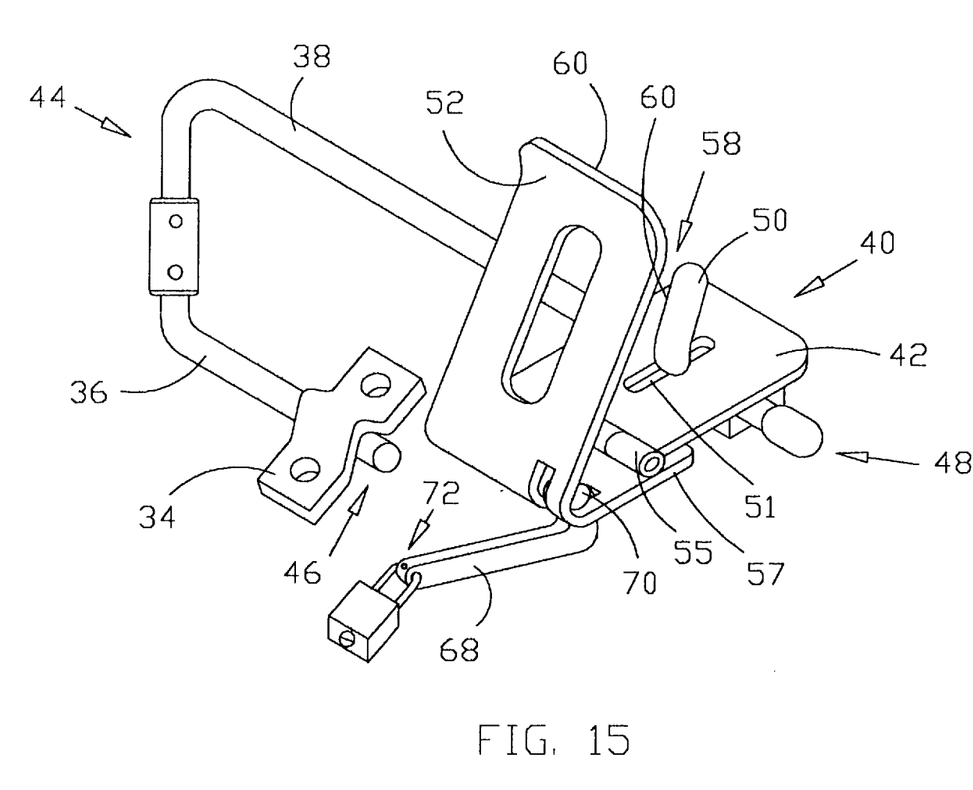
FIG. 15 is an enlarged view of the helmet holder assembly shown in FIG. 13, where the helmet holder assembly is not attached to a handle bar support assembly and the helmet holder assembly is in an open position; and, FIG. 16 is a front perspective view of another embodiment of my invention with a helmet supported on my helmet holder assembly, specifically showing the helmet locked to the helmet holder assembly.
Figure 16:
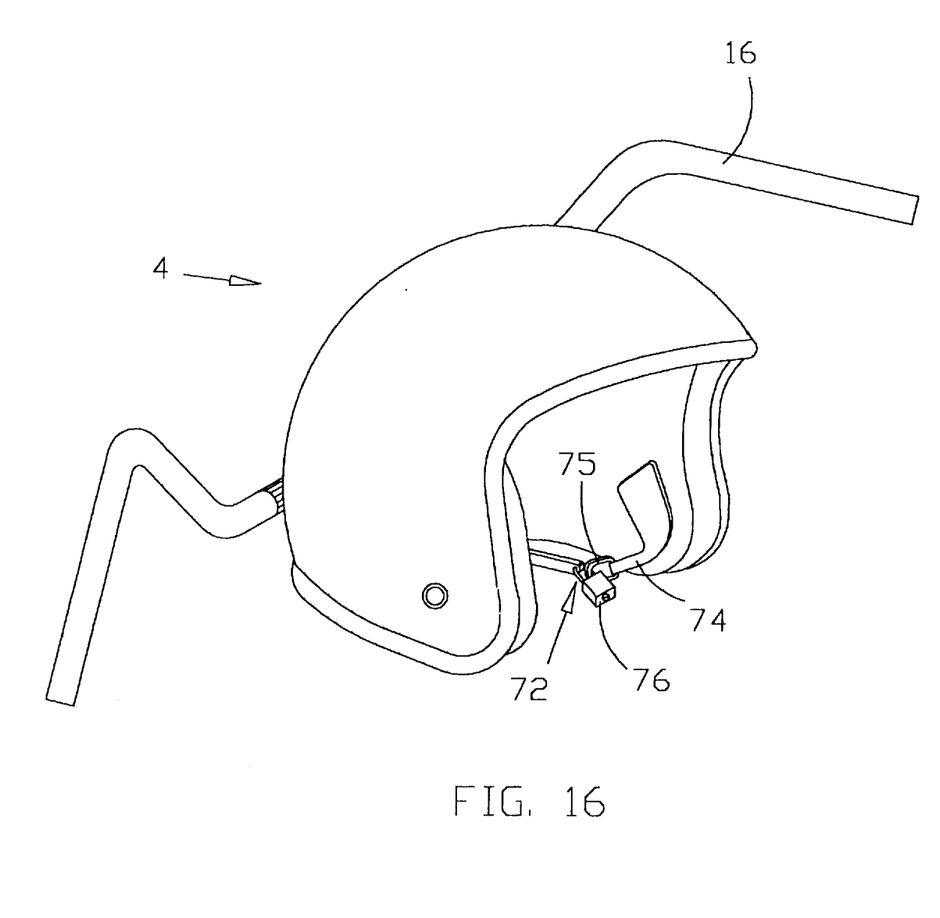

Another feature my invention includes a lock arm 68 having a first lock arm end 70 and a second lock arm end 72. The first lock arm end is pivotally connected to the arm and a lock 76 is connectable to the second lock arm end. Then, as known in the prior art and included in most motorcycle helmets, is a helmet strap 74 connected thereto. The locking mechanism of my invention is employed by either placing the helmet strap, and in particular a metal ring 75 that is connected to the strap, around the lock arm and then connecting the lock 76 to the second lock arm end 72 where the size of the metal ring 75 would prevent the ring from sliding off the lock arm past the lock. Alternatively, the metal ring of the helmet strap may be directly connected to the lock which is connected to the second lock arm end, as shown in FIG. 15, to thereby selectively lock the helmet to the helmet holder assembly.

Additional features of my invention include the post 50 being selectively positionable in a direction towards and away from the arm by movement in a post slot 51. The selective positionability enables my helmet holder to receive a variety of different helmets having different thicknesses between the confronting painted surface 66 and the inside surface 64. One example of how the post may be adjusted is shown in the drawings in FIG. 11. Here, the post comprises a post bolt like structure 84 inserted through the post slot 51 and adjustably secured therein by a post nut 86, which can be loosened and tightened as desired to position the post in the post slot.

The post is preferably covered with a protective type coating 88 such as rubber or the like, for obvious reasons to protect the confronting painted surface should it possibly come into contact with the post. Further, the post may be angled in a backward direction away from the arm. In this way, such an angle (a) assists a user in inserting a helmet into the cantilever slot with a reduced likelihood of the confronting painted surface contacting the post and also (b) better enables minimal contact between the post and the helmet, in particular, enabling contact between the post and the helmet at substantially only the lower back edge portion 78 of the helmet.

Other features of my invention comprise the arm 52 being pivotally connected to the base plate along a hinge 55. In this way the arm can be collapsed towards the post for compact storage during non-use of the helmet holder assembly. Additional collapsibility is obtained when the arm has a slot 54 therein and the slot is positioned to enable the arm to be more fully collapsed over the post. Also, the hinge 55 is preferably set back from a lower edge portion 57 of the arm so that the arm will have its own stop mechanism when the arm is in an upright position adapted to receive a helmet between the arm and the post.

Excellent results are further obtained when the arm is angled in a direction towards the post such that it is adapted to substantially coincide with a contoured shaped of the inside surface. In this way the impact of the compression force, exerted by the arm on the inside surface 64 as a result of the cantilever positioning of the helmet in the helmet holder, is minimized by spreading out the compression force over the whole surface area of the angled arm at each point where the arm contacts the contoured shape of the inside surface 64 of the helmet. Further utilizing the offset hinge 55, I have also provided my invention with a fine adjustment screw 53 located in the lower edge portion for more finely adjusting the angle of the arm 52 relative to the post 50.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A combination motorcycle and helmet holder, said helmet holder for holding a helmet in an upright position over a motorcycle, the motorcycle including a body portion, a handle bar structure and handle bar support assembly, a front wheel positioned forward of the body portion and a rear wheel positioned rearward of the body portion, the handle bar structure mounted to the handle bar support assembly, first means for removably securing the helmet holder to the handle bar structure, a mounting block structure substantially positioned rearward of the handle bar structure such that it lies over the body portion, second means for linking the first means to the mounting block structure and for maintaining the position of the mounting block structure relative to the handle bar structure such that the mounting block structure overlies the body portion when the handle bar structure is not being turned, and cantilever means connected to the mounting block structure for supporting the helmet in a cantilevered position over the main body portion and for maintaining the helmet in the cantilevered position substantially by a force of gravity exerted on the helmet so cantileveredly positioned.

2. The combination of claim 1, further comprising lock means connected to the mounting block structure for selectively locking the helmet to the helmet holder.

3. The combination of claim 1, wherein the mounting block structure further includes a base plate, the cantilever means comprises: a post connected to the base plate; an arm connected to the base plate; the post positioned a distance from the arm to provide a helmet receiving slot; and, the helmet insertable in the helmet receiving slot and loosely held therein by a force of gravity such that minimal compression forces are applied to an inside surface of the helmet and direct contact with a confronting painted surface of the helmet is substantially prevented.

4. The combination of claim 1, wherein the second means comprises a rigid mounting rod, the mounting rod having a first mounting end and a second mounting end, and wherein the first means comprises a split clamp assembly engageable about an outer circumference of the handle bar structure, the first mounting end adjustable connectable to the split clamp assembly at a distance from the second mounting end, the second mounting end adjustably connectable to the mounting block structure and the first and second mounting ends respectively adjustably connected to position the mounting block structure substantially over the longitudinal axis of the body portion.

5. The combination of claim 1, wherein the second means comprises a rigid lower mounting rod, and a rigid upper mounting rod, wherein the first means comprises a mounting cap, the mounting cap securing the lower mounting rod to the handle bar support assembly, the upper mounting rod being connected to the lower mounting rod at one end, the upper mounting rod being adjustably connectable to the mounting block structure at an other end, and the other end of the upper mounting rod being adjustably connected to the mounting block structure such that the mounting block structure is substantially positioned over the longitudinal axis of the body portion.

6. In a motorcycle including a body portion and a handle bar structure mounted thereon, a front wheel positioned forward of the body portion and a rear wheel positioned rearward of the body portion, the improvement comprising:

a helmet holder assembly for holding a helmet in an upright position over the body portion;
the helmet holder assembly comprising:
first means for removably securing the helmet holder assembly to the handle bar structure;
a mounting block structure substantially positioned rearward of the handle bar structure such that it lies over the body portion;

second means for linking the first means to the mounting block structure and for maintaining the position of the mounting block structure relative to the handle bar structure such that the mounting block overlies the body portion when the handle bar structure is not being turned; and
cantilever means connected to the mounting block structure for supporting the helmet in a cantilevered position over the body portion and for maintaining the helmet in the cantilevered position substantially by a force of gravity exerted on the helmet so cantileveredly positioned.

7. The improvement of claim 6, further comprising lock means connected to the mounting block structure for selectively locking the helmet to the helmet holder assembly.

8. The improvement of claim 7, wherein the lock means comprises a lock arm having a first lock arm end and a second lock arm end, the first lock arm is pivotally connected to the arm, a lock is connectable to the second lock arm end so as to selectively lock a helmet to the helmet holder assembly.

9. The improvement of claim 6, wherein the first means comprises a split clamp assembly engaged about an outer circumference of the handle bar structure, the split clamp assembly having a pair of opposed first ends and a pair of opposed second ends, the split clamp assembly adapted to be biased at the pair of opposed first ends by a nut and bolt type structure where biasing the pair of opposed first ends together pivotally biases the pair of opposed second ends together securely about the handle bar structure.

10. The improvement of claim 9, wherein the second means comprises a rigid mounting rod, the mounting rod having a first mounting end and a second mounting end, the first mounting end adjustably connectable to the split clamp assembly at a distance from the second mounting end, the second mounting end adjustably connectable to the mounting block structure, and the first and second mounting ends respectively adjustably connected to substantially position the mounting block structure over the longitudinal axis of the body portion.

11. The improvement of claim 6, wherein the mounting block structure further includes a base plate, the cantilever means comprises: a post connected to the base plate; an arm connected to the base plate; and, the post positioned a distance from the arm to provide a helmet receiving slot for the helmet to be inserted therein and loosely held by the force of gravity in the cantilevered position whereby minimal compression forces are applied to an inside surface of the helmet and direct contact with a confronting painted surface of the helmet is substantially prevented.

12. The improvement of claim 11, wherein the post is selectively positionable in a direction towards and away from the arm.

13. The improvement of claim 12, wherein the post is angled in a backward direction away from the arm.

14. The improvement of claim 11, wherein the arm is pivotally connected to the base plate.

15. The improvement of claim 14, wherein the arm is angled in a direction towards the post and adapted to substantially coincide with a contoured shape of the inside surface of the helmet.

16. The improvement of claim 14, wherein the arm has a slot therein and the slot is positioned to enable the arm to be collapsed over the post.

17. A helmet holder assembly for holding a helmet in an upright position on a motorcycle including a body portion and a handle bar structure mounted thereon, the helmet holder assembly comprising;

first means for removably securing the helmet holder assembly to the handle bar structure;

a mounting block structure substantially positioned over a longitudinal axis of the body portion;

second means for linking the first means to the mounting block structure and for maintaining the position of the mounting block structure relative to the handle bar structure such that the mounting block structure overlies the longitudinal axis of the body portion when the handle bar structure is not turned;

the mounting block structure further including a base plate;

an arm connected to the base plate;

a post connected to the base plate a distance from the arm;

the distance between the arm and the post defining a helmet receiving slot located therebetween;

the helmet receiving slot enabling the helmet to be rotatably inserted therein by advancing a lower back edge portion of the helmet into the helmet receiving slot, forwardly rotating the helmet to drop a lower front edge portion of the helmet relative to the lower back edge portion, the lower front edge portion being positioned on an inclined plane extending downwardly and the helmet when fully inserted in the helmet receiving slot having the lower front edge portion positioned slightly below the lower back edge portion.

18. A helmet holder assembly for holding a helmet in an upright position on a motorcycle including a body portion and a tubular structure connected to the body portion, the helmet holder assembly comprising:

a mounting assembly for removably securing the helmet holder assembly to the tubular structure;

a mounting block structure positioned over the body portion;

at least one mounting rod connected between the mounting block structure and the mounting assembly and thereby linking the mounting block structure to the mounting assembly and maintaining the position of the mounting block structure relative to the tubular structure;

the mounting block structure including a helmet receiving slot having an inner slot edge; and, the helmet receiving slot enabling the helmet to be rotatably inserted therein so that when the helmet is being rotatably inserted therein and when the helmet is fully inserted therein a confronting painted surface of the helmet is maintained substantially free and clear of contact with the inner slot edge.

19. The helmet holder assembly of claim 18, wherein lock means is connected to the mounting block structure for selectively locking the helmet to the helmet holder assembly.

20. The helmet holder assembly of claim 18, wherein the tubular structure comprises a member from the group consisting of a handle bar structure and a rack structure.

21. A combination motorcycle and helmet holder for holding a helmet in an upright position over a motorcycle, said motorcycle including a body portion, a handle bar structure and handle bar support assembly, the handle bar structure mounted to the handle bar support assembly, first means for removably securing the helmet holder to the handle bar structure, a mounting block structure substantially positioned over a longitudinal axis of the body portion, second means for linking the first means to the mounting block structure relative to the handle bar structure such that the mounting block structure overlies the longitudinal axis of the body portion when the motorcycle is not being turned, and cantilever means connected to the mounting block structure for supporting the helmet in a cantilevered position over the main body portion and for maintaining the helmet in the cantilevered position substantially by a force of gravity exerted on the helmet so cantileveredly positioned, wherein the mounting block structure further includes a base plate, and wherein the cantilever means comprises a post connected to the base plate and an arm connected to the base plate, said post positioned a distance from the arm to provide a helmet receiving slot, the helmet insertable in the helmet receiving slot and loosely held therein by a force of gravity such that minimal compression forces are applied to an inside surface of the helmet and direct contact with a confronting painted surface of the helmet is substantially prevented.

22. In a motorcycle including a body portion and a handlebar structure mounted thereon, the improvement comprising, a helmet holder assembly for holding a helmet in an upright position over the body portion;

the helmet holder assembly comprising:

first means for removably securing the helmet holder assembly to the handle bar structure;

a mounting block structure substantially positioned over a longitudinal axis of the body portion;

second means for linking the first means to the mounting block structure and for maintaining the position of the mounting block structure relative to the handle bar structure such that the mounting block structure overlies the longitudinal body portion when the motorcycle is not being turned; and, cantilever means connected to the mounting block structure for supporting the helmet in a cantilevered position over the body portion and for maintaining the helmet in the cantilevered position substantially by a force of gravity exerted on the helmet so cantileveredly positioned, and wherein said cantilever means is pivotably connected to said mounting block.

* * * * *